No. 698,952. Patented Apr. 29, 1902.
W. W. HOFFMAN & F. W. POWERS.
RAILWAY SWITCH.
(Application filed Aug. 12, 1901.)
(No Model.) 3 Sheets—Sheet 1.
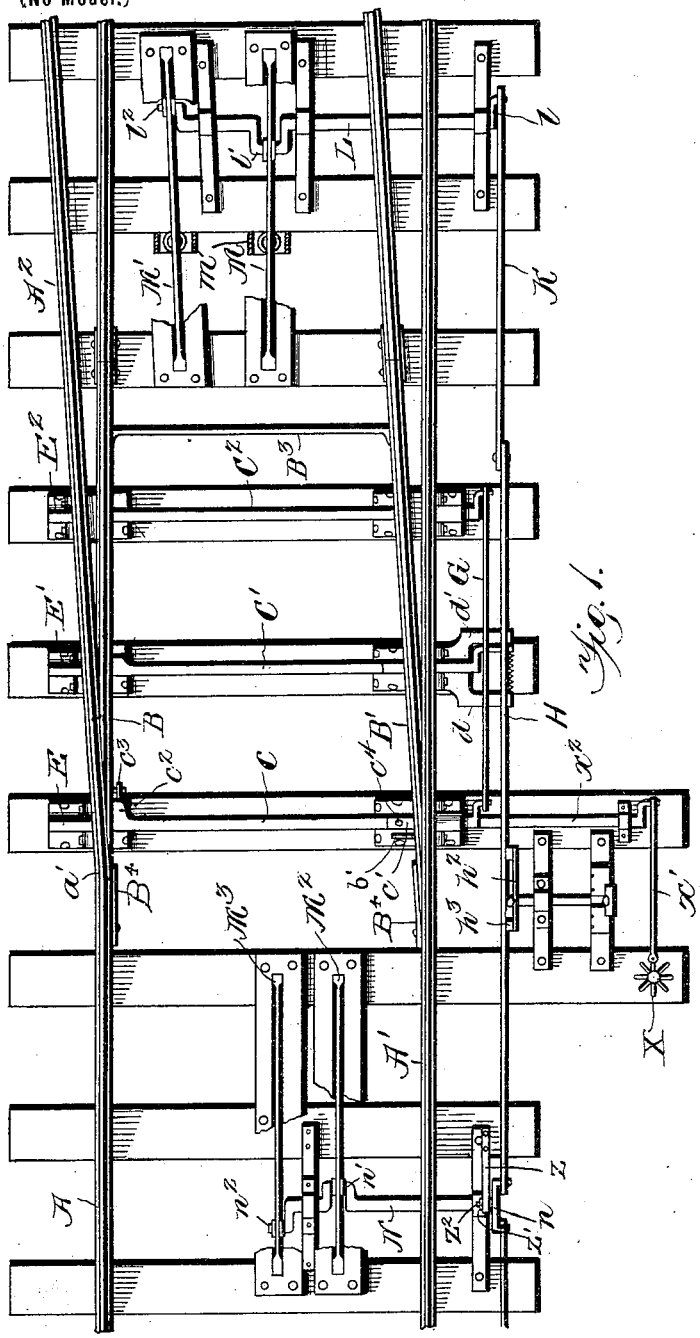
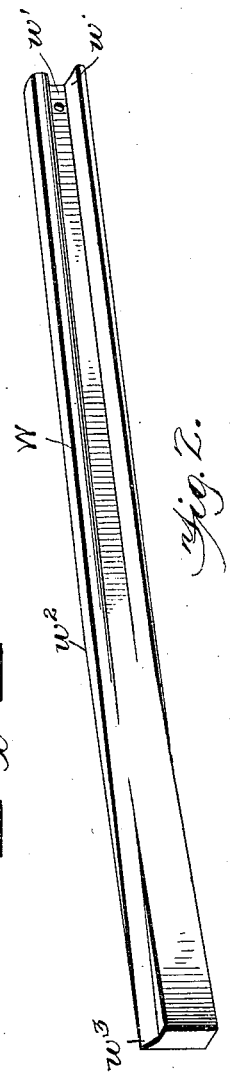
Witnesses
Inventors
W. W. Hoffman and
F. W. Powers,
by Wilkinson & Fisher
Attorneys.

No. 698,952. Patented Apr. 29, 1902.
W. W. HOFFMAN & F. W. POWERS.
RAILWAY SWITCH.
(Application filed Aug. 12, 1901.)
(No Model.) 3 Sheets—Sheet 2.
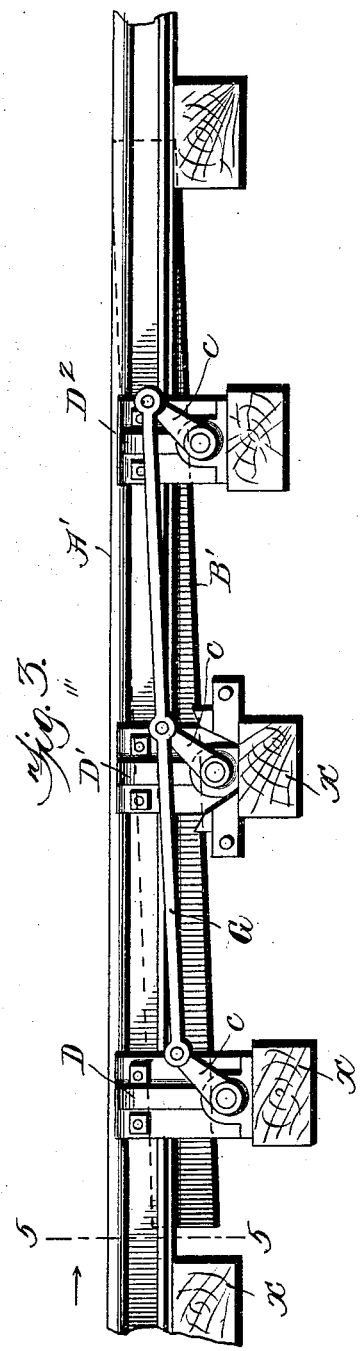
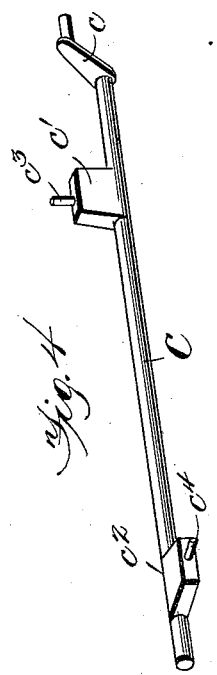
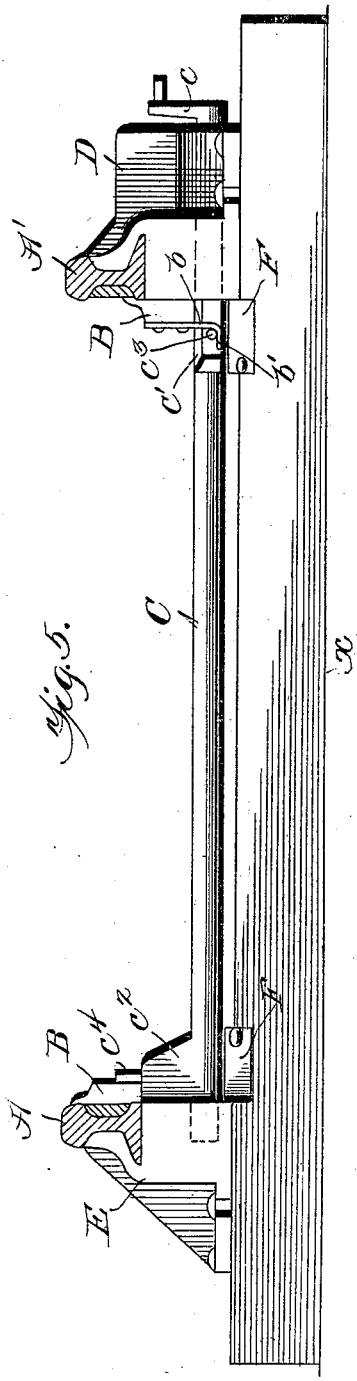
Witnesses
Inventors
W. W. Hoffman and
F. W. Powers.
by Wilkinson & Fisher
Attorneys No. 698,952. Patented Apr. 29, 1902.
W. W. HOFFMAN & F. W. POWERS.
RAILWAY SWITCH.
(Application filed Aug. 12, 1901.)
(No Model.) 3 Sheets—Sheet 3.
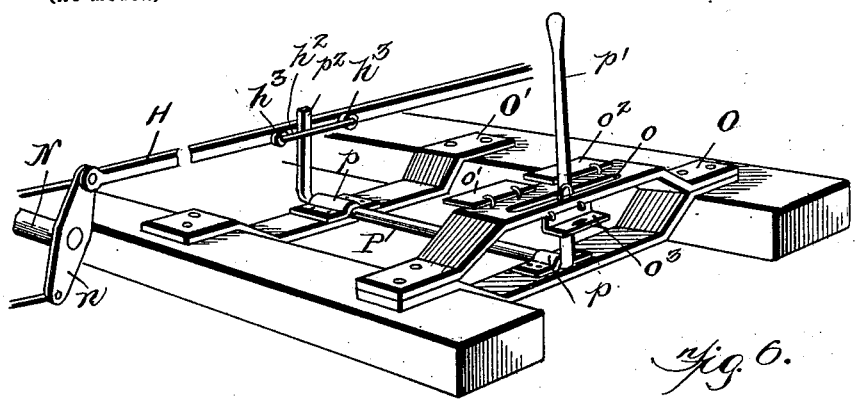
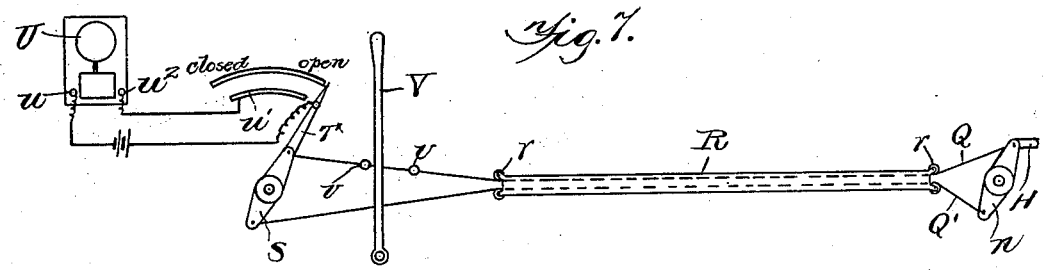
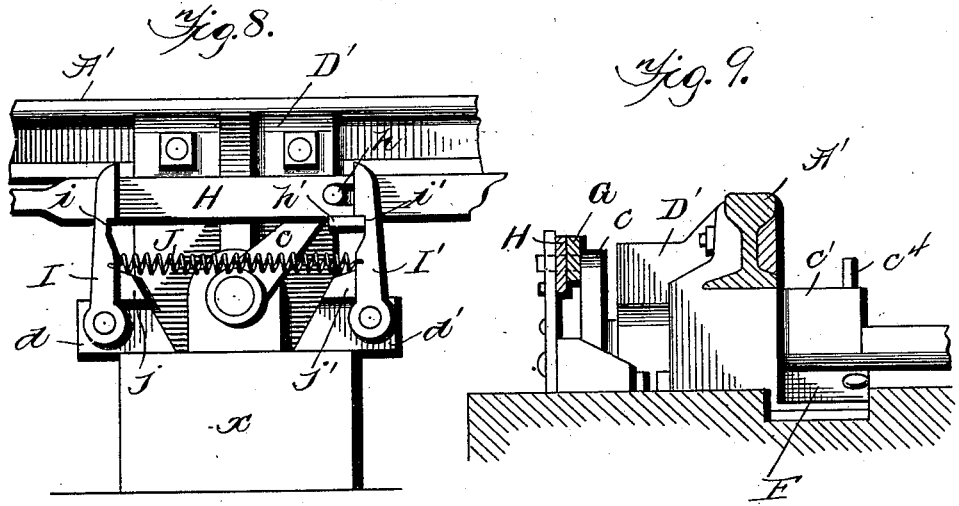

UNITED STATES PATENT OFFICE.

WILLIAM W. HOFFMAN AND FRANCIS W. POWERS, OF WEST LAFAYETTE, INDIANA, ASSIGNORS TO ELECTRIC AND STEAM RAILWAY SUPPLY CO., OF LAFAYETTE, INDIANA.

RAILWAY-SWITCH.

SPECIFICATION forming part of Letters Patent No. 698,952, dated April 29, 1902.

Application filed August 12, 1901. Serial No. 71,817. (No model.)

*To all whom it may concern:*

Be it known that we, WILLIAM W. HOFFMAN and FRANCIS W. POWERS, citizens of the United States, residing at West Lafayette, in the county of Tippecanoe and State of Indiana, have invented certain new and useful Improvements in Railway-Switches; and we do hereby declare the following to be a full, clear, and exact description of the invention, such as will enable others skilled in the art to which it appertains to make and use the same.

Our present invention relates to railway-switches, and has for its object certain improvements over the invention shown and described in Letters Patent No. 664,750, granted to us on the 25th day of December, 1900.

It also contains certain features of novelty that will hereinafter appear.

In order that our said invention may be more fully understood, reference will be had to the accompanying drawings, wherein the same letters of reference are used to designate similar parts throughout the several views.

Figure 1 represents a plan view of the assembled switch. Fig. 2 is an enlarged view of one of the switch-points, such as we prefer to employ, removed from the switch. Fig. 3 is a side elevation of the switch shown in Fig. 1, parts being omitted. Fig. 4 is a perspective view of one of the rock-shafts which support the vertically-movable switch-points. Fig. 5 represents a section through the rails at the point 5 5, Fig. 3, looking in the direction of the arrow, the switch being closed for the main track. Fig. 6 is a perspective view of the hand-operating mechanism for the switch. Fig. 7 is a diagrammatic view of the station-indicating mechanism and switch-operating lever. Fig. 8 is a detail view, enlarged, of the switch-locking mechanism; and Fig. 9 represents a sectional view through the rails, showing the chair to which the locking mechanism is attached in elevation.

Referring first to Fig. 1, A A' represent the main rails, the rail A' being continuous, while the rail A is bent off at an angle at $a'$ to form the rail $A^2$ of the siding. B B' represent the vertically-movable switch-points for directing the wheels upon the main track or siding, the switch-point B being elevated when the switch is closed for the main track, the switch-point B' at this time being depressed, the positions of the switch-points being exactly reversed when the switch is open for the main track. $B^3$ is a spacing-bar connecting these switch-points B B'. Beneath these switch-points B B' are located a plurality of rock-shafts, the number of which may be varied as desired. Three of these rock-shafts are shown in the drawings and are designated C C' $C^2$. Each of these rock-shafts is provided at one end with a crank $c$ and with the radially-disposed lugs or supports $c'$ $c^2$, each set at an angle of ninety degrees around the shaft. Projecting from these lugs $c'$ $c^2$ on the rock-shaft C are radial pins $c^3$ $c^4$, the purpose of which will hereinafter appear. D D' $D^2$ are chairs, of iron or other suitable material, resting upon and securely fastened to the ties $x$ and bolted to the main rails, the chair D at the point of the switch being the highest and the chair $D^2$ at the pivoted end of the switch-point the lowest, these chairs being graduated to the depression of the switch-rail. The crank ends of these rock-shafts C $C^2$ pass through these chairs D $D^2$, said chairs forming a solid and rigid bearing for the same, the opposite ends of these rock-shafts entering the chairs E $E^2$ upon the opposite side of the track, forming a solid bearing upon that side. F F are metallic plates or projections, preferably made integral with the chairs, and are provided upon their upper faces with inclined surfaces sloping toward both ends, so that obstructions cannot lodge thereon. The switch-points B B' are supported upon these lugs $c'$ $c^2$, the arrangement of these lugs being such that when all of the lugs upon one end of these rock-shafts beneath one switch-point are in the uppermost position, and consequently support that switch-point up into position to engage the flanges of the wheels, the lugs upon the opposite ends of these rock-shafts are depressed, allowing the switch-point which they support to be lowered out of engagement with the wheel-flanges. In order to insure the depression of the switch-points when the rock-shafts are rotated, an extension $b$ is provided having a bent end $b'$, adapted to be engaged by the pin $c^3$ or $c^4$ upon the rock-shaft C when the same is rotated. To the cranks $c$ of these rock-shafts C $C^2$ is attached a connecting-rod G, the pin of the crank upon the middle shaft C' being elongated. H is a rod connected to this elongated crank-pin, provided with an elongated slot $h$, through which said elongated crank-pin passes. Projecting from the chair D' are a pair of lugs $d$ $d'$, upon which are pivotally supported the latches or dogs I I', connected by the spiral tension-spring J, constantly tending to draw these latches toward each other. Stops $j$ $j'$ are provided to limit the inward movement of these latches. These latches I I' are provided with recesses $i$ $i'$, respectively, into which the lug $h'$ upon the rod H is adapted to rest when the switch is either fully open or fully closed. Connected to this rod H is a connecting-rod K, which in turn is connected to the crank $l$ upon the crank-shaft L. This crank-shaft is provided with a pair of cranks $l'$ $l^2$, diametrically set upon the shaft L, above which are located the pivoted plates M M', resting upon the springs $m$. The opposite end of the rod H is connected to the crank $n$ upon the crank-shaft N, provided with the diametrically-set cranks $n'$ $n^2$, above which are located the pivoted plates $M^2$ $M^3$, also resting upon springs $m$. X represents an indicating device of any suitable type, adapted to be operated by the connecting-rod $x'$, connected to the rock-shaft $x^2$, which in turn may be connected to one of the rock-shafts C $C^2$, which indicates to the engineer whether the switch is open or closed.

Referring now particularly to Fig. 6, which represents the hand-operating mechanism for the switch, O O' represent bearing-plates suspended between the ties, upon which is supported the rock-shaft P, mounted in bearings $p$ $p$. This rock-shaft is provided at one end with a hand-operating lever $p'$, and upon its opposite end is provided a crank-arm $p^2$. This crank-arm $p^2$ is adapted to rest in the frame $h^2$ upon the rod H and when swung far enough to either side engages one of the rollers or stops $h^3$. To lock the shaft P from rotating when not desired, the operating-lever $p'$ is passed through an elongated slot $o$ in the support O, and hinged plates $o'$ $o^2$ are provided upon the top of this support, which plates are adapted to cover the slot upon each side of the operating-lever $p'$ when the same is in its vertical position, when the hasp $o^3$, which overlaps the edges of these plates $o'$ $o^2$, can be swung up and locked.

In Fig. 7 is shown an indicator adapted to be used in connection with our improved switch, also a switch-operating mechanism adapted to be operated from the station or other distant point. When these devices are employed, wires or flexible rods Q Q' are connected to the double crank $n$, which are preferably carried in an inclosing casing R to protect the wires, this casing being provided with rollers $r$ $r$ to prevent binding and undue wear upon the ends of the casing. These wires Q Q' lead from the switch to the station or other distant point through the casing R, the ends of these wires being connected to the double crank or rocker S. When the switch is operated, this crank S is rocked, and as this crank carries a needle T the condition of the switch may be seen at any time. If desired, an alarm may be provided, which will be operated each time the switch is moved. In the drawings an electric bell $u$ and its circuit-completing attachment is shown, one of the terminals $u$ being connected to the indicator-needle T, carrying a contact adapted to bear upon the segmental plate $u'$, connected to the opposite terminal $u^2$ of the bell, the needle T in swinging from one position to another causing its contact to pass over this segmental plate, and thus completing the circuit through the bell, the circuit being again interrupted when the needle has completed its movement in either direction upon the switch being either fully opened or closed, as the contact will pass off the end of the segmental plate $u'$; but should the switch be only partly opened or closed the alarm will continue to sound, giving warning to the operator at the station. V is a hand-lever for testing and operating the switch from the station, the swinging of the lever V far enough in either direction causing the same to bind against one of the stops $v$ upon the wire Q, causing the same to be reciprocated, the wire Q communicating its motion to the rod H, and so on to the switch-points. This lever may be provided with the locking mechanism, as shown in Fig. 6, for locking the lever in its vertical position.

In Fig. 2 is shown a novel form of switch-point which we prefer to employ in connection with our invention. The lower flange $w$ of this rail from its pivoted end to the point $w^2$, where it touches the adjacent main rail, is narrower and the web is thicker than in the ordinary rail, and from the point $w^2$ to the end of the rail $w^3$ it is to be rolled tapering toward the end to a thickness necessary to give it sufficient strength. This portion of the rail has no flange, but its cross-sections are rectangular in shape. At the point $w^2$, where the switch-point is to fit against the side of the adjacent rail, this switch-point is bent so as to bring its outer edge into line to properly fit against the side of its adjacent rail. The inner or gage side of the rail is then cut out deep enough for the wheel-flanges, beginning at the point $w^2$ and increasing until a point is formed at the end $w^3$, thus keeping the gage side of the rail in one continuous straight line. The web at the point of the rail will be of the full thickness below the cut-away portion, thus materially increasing the strength of the rail.

The operation of the switch is as follows: Taking up the automatically-operated mechanism first, it will be understood that the pivoted plates M M' are located at one end of the switch and the plates $M^2$ $M^3$ at the opposite end of the switch, which are adapted to be operated by wheels or other attachments carried by the locomotive, as has been fully shown and described in our patent aforesaid. When either of these plates are depressed, its shaft L or N, as the case may be, is rotated. Supposing for convenience that the plate M is depressed, the shaft L will be rotated, the crank $l$, carried thereby, swinging the rod H back toward the left. Until this rod H is reciprocated the switch cannot be operated, as the lug $h'$ (see Fig. 8) is held down by the latch or dog I', preventing the crank $c$ from rotating; but when the rod H is reciprocated toward the left, as before stated, by the pivoted plates M or $M^3$ the slot $h$ in the rod H allows the said rod to be moved far enough to allow the lug $h'$ to become disengaged from the latch I'. Subsequent movement of this rod H is then transmitted to the crank $c$, causing said crank to rotate, reciprocating the connecting-rod G, thereby rotating the rock-shafts C $C^2$. This causes the rail B' to be lowered and the rail B raised, so as to close the switch for the main line and open it for the siding. When the plate M' or $M^2$ is operated upon, this same cycle of operations is repeated; but the parts are moved in the opposite direction and will set the switch for the siding, leaving the switch open for the main line. For trains approaching the switch in one direction the plates M M' are acted upon, and trains approaching in the opposite direction act upon the plates $M^2$ $M^3$. When it is desired to operate the switch either way by hand, the hasp $o^3$ is unlocked and one of the plates $o'$ or $o^2$ is swung back and the operating-handle $p'$ swung in that direction, depending upon whether the switch is to be opened or closed, one lid or plate being always closed to prevent the lever from being moved too far in being moved to its vertical position. In order to prevent the crank-arm $p^2$ from locking the rod H against operation from either the station or by the automatic means while the operating-handle $p'$ is locked, the rollers or stops $h^3$ $h^3$, between which the crank-arm $p^2$ rests, are spaced so that during the movement of this rod H in either direction said rollers do not move far enough to engage the crank-arm $p^2$. Then when the operating-lever $p'$ is swung back—say toward the left—the crank-arm $p^2$ will engage the roller or stop $h^3$ and move the rod H toward the left, which will in this case cause the switch to be closed for the main track. The motion of this rod H when reciprocated toward the left will aways close the switch for the main track and when moved toward the right will open the switch, no matter by what means said rod may be actuated.

A device for holding the reciprocating rod H to its extreme positions consists of a roller $z'$, pinioned on the bearing $z^2$, projecting from the double crank $n$. A spring $z$, fastened to the tie, rests on this roller and presses it downwardly, this pressure tending to retain the crank $n$, and consequently the reciprocating rod H and its connected parts, in their extreme positions when shifted, thus preventing the partial opening or closing of the switch, as well as to insure the proper action of the switch-locking mechanism hereinbefore described.

As will be obvious, the switch cannot be operated unless the rod H is operated, because until this rod H is reciprocated in the proper direction the switch is locked. The movement of this rod H is indicated in the station by the indicator-needle T, carried by the double crank or rocker S, which is connected to the rod H by means of the wires Q Q' through the double crank $n$. Thus when said rod is reciprocated toward the left the indicating-needle T swings over toward the left, causing an electric contact which it carries to slide over the sector $n'$ and complete the circuit of an electric bell. If the switch is fully closed, the bell will cease to ring; but should the switch be only partially closed the contact will still remain upon this segmental plate $u'$, causing the bell to ring, which ringing will continue until the switch is properly closed. This indicator is preferably provided with a dial, upon which may be marked the positions where the needle must rest when the switch is closed and open. Should it be desired to operate the switch from the switch tower or station, the operating-lever V is brought into action, said lever being swung to the left to close the switch and to the right to open the same.

The indicator X may be located in proximity to the switch, and its rock-shaft $x^2$ is connected to one of the rock-shafts of the switch, so that when the switch is operated said indicating device is operated also and is not dependent upon the hand-operating mechanism.

In placing this switch upon a railway it will be found advantageous to board over the various operating parts in order to prevent obstructions from falling into the switch and jamming the working parts, as well as to keep the parts clear of snow, ice, and the like, such a covering being shown in our patent hereinbefore referred to; but, if preferred, this covering may be omitted.

While we have shown our invention as embodied in the form herein shown and described, it is obvious that many changes and modifications might suggest themselves to those skilled in the art, and it will be understood that we do not limit ourselves to the precise details herein shown and described.

Having thus described our said invention, what we claim, and desire to secure by Letters Patent of the United States, is—

1. In a railway-switch, the combination with vertically-movable switch-points, rock-shafts for elevating and depressing said switch-points, cranks upon the ends of said shafts, and a rod connecting said cranks; of a rod connected to one of said cranks, and a lock for preventing the movement of said switch except through the reciprocation of said rod, substantially as described.

2. In a railway-switch, the combination with vertically-movable switch-points, and rock-shafts supporting said switch-points; of a reciprocating rod connected to said rock-shafts, a lug upon said rod, and latches or dogs adapted to engage said lug, substantially as described.

3. In a railway-switch, the combination with vertically-movable switch-points, rock-shafts for elevating and depressing said switch-points, and cranks upon the ends of said rock-shafts; of a rod connected to one of the cranks upon said rock-shafts, a lug carried by said rod, and latches or dogs adapted to engage said lug, substantially as described.

4. In a railway-switch, the combination with vertically-movable switch-points, rock-shafts for elevating and depressing said switch-points, cranks upon the ends of said rock-shafts, and a rod connecting said cranks together; of a rod having an elongated slot adapted to engage one of said cranks, a lug carried by said rod, and latches or dogs adapted to engage said lug, and lock the switch, substantially as described.

5. In a railway-switch, the combination with vertically-movable switch-points, rock-shafts adapted to elevate and depress said switch-points, cranks upon the ends of said rock-shafts, and chairs supporting the main rails, in which said rock-shafts are journaled; of a rod connected to said cranks, a lug carried by said rod and latches or dogs supported upon one of said chairs, adapted to engage said lug when the switch is either open or closed, substantially as described.

6. In a railway-switch, the combination with vertically-movable switch-points, rock-shafts, lugs carried by said rock-shafts for elevating and depressing said switch-points, and cranks upon said rock-shafts, connected together by a rod; of a rod connected to one of said cranks; a pair of rollers or stops secured upon said rod, and a crank adapted to reciprocate said rod through said rollers or stops, substantially as described.

7. In a railway-switch, the combination with the switch-points, and means for raising and lowering said switch-points; of a rod connected to said mechanism, a rock-shaft carrying an operating-lever, rollers upon said rod, and a crank-arm upon said rock-shaft, adapted to reciprocate said rod through said rollers, substantially as described.

8. In a railway-switch, the combination with the switch-points, and means for raising and lowering said switch-points; of a rod connected to said mechanism, a rock-shaft carrying an operating-lever, rollers upon said rod, a crank-arm upon said rock-shaft, adapted to reciprocate said rod through said rollers, and means for locking said rock-shaft against rotation, substantially as described.

9. In a railway-switch, the combination with switch-points, and means including a rod, for operating said switch-points; of a rock-shaft supported in bearings between the ties, an operating-lever carried by said rock-shaft, a crank-arm upon the opposite end of said rock-shaft, stops upon said rod with which said crank-arm is adapted to engage, a slot in said bearing, and hinged plates adapted to cover said slot upon each side of said operating-lever, locking the same against operation, substantially as described.

10. In a railway-switch, the combination with switch-points, and mechanism including a rod for operating said switch-points; of a double crank connected to one end of said rod, wires connecting said double crank to an indicator, and an alarm or other device adapted to sound when the switch is opened or closed, substantially as described.

11. In a railway-switch, the combination with the switch-points, and mechanism including a rod for operating said switch-points; of a double crank connected to one end of said rod, wires connecting said double crank to a second double crank, adapted to be located in a station, and an operating-lever adapted to engage stops upon one of said wires, to reciprocate said rod, substantially as described.

12. In a railway-switch, the combination with the switch-points, and mechanism including a rod for operating said switch-points; of a double crank connected to one end of said rod, wires connecting said double crank to a second double crank, adapted to be located in a station, an operating-lever adapted to engage stops upon one of said wires, to reciprocate said rod, and an indicator carried by said double crank, substantially as described.

13. In a railway-switch, the combination with vertically-movable switch-points, and rock-shafts, supporting said switch-points; of a reciprocating rod connected to said rock-shafts, a lug upon said rod, latches or dogs adapted to engage said lug, and stops adapted to limit the movement of said latches, substantially as described.

14. In a railway-switch, the combination with vertically-movable switch-points, and rock-shafts supporting said switch-points, adapted to elevate and depress said switch-points; of a reciprocating rod connected to said rock-shafts, a lug upon said rod, latches or dogs adapted to engage said lug, a spring tending to draw said latches together, and stops adapted to limit the movement of said latches, substantially as described.

15. In a railway-switch, the combination with the switch-points, and mechanism including a rod for operating said switch-points; of a double crank connected to one end of said rod, wires connecting said double crank to a second double crank, adapted to be located in a station, an operating-lever adapted to engage stops upon one of said wires, to reciprocate said rod, and means for locking said operating-lever against operation, substantially as described.

16. In a railway-switch, the combination with the switch-points, and mechanism including a rod for operating said switch-points; of a double crank connected to one end of said rod, wires connecting said double crank to a second double crank, adapted to be located in a station, an operating-lever adapted to engage stops upon one of said wires, to reciprocate said rod, an indicator carried by said double crank, an electrical contact carried by said indicator, a sector-plate upon which said contact is adapted to bear, and a bell or other device connected in circuit with said plate and contact, adapted to ring when the switch is being opened or closed, substantially as described.

17. A switch-point for railway-switches, comprising a rail having its free end bent at an angle, and the gage side of this bent portion cut away to form a straight line with the remaining portion of the rail, deep enough to allow the wheel-flanges to pass.

18. A switch-point for railway-switches, comprising a rail having narrow flanges at its pivoted end, these flanges disappearing at the free end of the switch-point, and the free end of the switch-point being composed of a solid tapering rectangular section; said rectangular portion being bent off from the remaining portion of the switch at an angle so as to fit against the side of the adjacent main rail, the gage side of the bent rectangular portion of the rail being cut away in a straight line with the gage side of the remaining portion of the rail, the portion below this cut-away portion being left intact.

In testimony whereof we affix our signatures in presence of two witnesses.

WILLIAM W. HOFFMAN.
FRANCIS W. POWERS.

Witnesses:
FRANK A. ROBERTS,
SCOTT SHOBE.